United States Patent
Shafiulla et al.

(10) Patent No.: US 10,304,013 B2
(45) Date of Patent: May 28, 2019

(54) REAL TIME ANIMATION GENERATOR FOR VOICE CONTENT REPRESENTATION

(71) Applicant: SAP SE, Walldorf (DE)

(72) Inventors: Mohammed Saifulla Shafiulla, Bangalore (IN); Shahid Mohammed Syed, Bangalore (IN); Raghuraj Shetty, Bangalore (IN); Mohamed Riswan Abdul Lathif, Munich (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/181,037

(22) Filed: Jun. 13, 2016

(65) Prior Publication Data

US 2017/0357636 A1 Dec. 14, 2017

(51) Int. Cl.
| | | |
|---|---|---|
| *H04M 3/42* | (2006.01) | |
| *H04M 3/51* | (2006.01) | |
| *G06Q 10/04* | (2012.01) | |
| *G10L 15/26* | (2006.01) | |
| *G10L 21/10* | (2013.01) | |
| *G06F 17/27* | (2006.01) | |
| *G06Q 30/02* | (2012.01) | |
| *H04M 7/00* | (2006.01) | |

(52) U.S. Cl.
CPC ......... *G06Q 10/04* (2013.01); *G06F 17/2785* (2013.01); *G06Q 30/02* (2013.01); *G10L 15/26* (2013.01); *G10L 21/10* (2013.01); *H04M 3/5133* (2013.01); *H04M 3/42221* (2013.01); *H04M 3/51* (2013.01); *H04M 7/006* (2013.01); *H04M 2201/40* (2013.01); *H04M 2201/42* (2013.01); *H04M 2203/1058* (2013.01); *H04M 2203/401* (2013.01)

(58) Field of Classification Search
CPC ....... H04M 2203/401; H04M 3/42221; H04M 3/51
See application file for complete search history.

(56) References Cited

U.S. PATENT DOCUMENTS

| | | | | |
|---|---|---|---|---|
| 5,884,032 | A * | 3/1999 | Bateman | G06F 17/30899 370/356 |
| 6,298,356 | B1 * | 10/2001 | Jawahar | G06F 11/3495 |
| 2002/0184373 | A1 * | 12/2002 | Maes | G10L 15/30 709/228 |
| 2007/0071206 | A1 * | 3/2007 | Gainsboro | H04M 3/2281 379/168 |
| 2010/0180202 | A1 * | 7/2010 | Del Valle Lopez | G06F 3/048 715/728 |
| 2010/0246800 | A1 * | 9/2010 | Geppert | G06F 3/04817 379/265.09 |

(Continued)

*Primary Examiner* — Samuel G Neway
(74) *Attorney, Agent, or Firm* — Mintz Levin Cohn Ferris Glovsky and Popeo, P.C.

(57) ABSTRACT

During a voice conversation, conversationally continuous voice input may be received from at least a first participant of the voice conversation. During the voice conversation, the conversationally continuous voice input may be converted into text, and the text may be analyzed to characterize content thereof. Using a graphical user interface displayed to at least a second participant of the voice conversation, a voice content animation may be rendered that visually represents the characterized content and is repeatedly updated as new content is characterized during the voice conversation.

20 Claims, 8 Drawing Sheets

(56) References Cited

U.S. PATENT DOCUMENTS

| | | | | |
|---|---|---|---|---|
| 2010/0323728 A1* | 12/2010 | Gould | .............. | H04M 3/42391 |
| | | | | 455/466 |
| 2011/0208522 A1* | 8/2011 | Pereg | ................... | G06F 17/279 |
| | | | | 704/235 |
| 2011/0276327 A1* | 11/2011 | Foxenland | .............. | G10L 15/26 |
| | | | | 704/235 |
| 2011/0282662 A1* | 11/2011 | Aonuma | ................. | G10L 17/26 |
| | | | | 704/231 |
| 2014/0140497 A1* | 5/2014 | Ripa | .................. | H04M 3/5133 |
| | | | | 379/265.06 |
| 2015/0073772 A1* | 3/2015 | Jun | ........................ | G10L 13/00 |
| | | | | 704/8 |
| 2015/0195406 A1* | 7/2015 | Dwyer | ................ | H04M 3/5175 |
| | | | | 379/265.07 |
| 2015/0237075 A1* | 8/2015 | Inoue | ................. | H04L 65/1069 |
| | | | | 348/14.12 |
| 2016/0191958 A1* | 6/2016 | Nauseef | .......... | H04N 21/23418 |
| | | | | 725/116 |
| 2016/0352900 A1* | 12/2016 | Bell | .................... | H04M 3/5175 |

\* cited by examiner

```
■ 000001.sql ■ 000002.sql ■ 000003.sql ■ Speech1.xls ■ Vt.controller.js ■ 000004.sql ■ Prod.hdbtextdict
 1 <?xel version='1.0" encoding,"utf-8" ?>
 2 <dictionary xmlns="http://www.sap.com/ta/4.0">
 3
 4    <entity_category name="offers">
 5       <entity_name standard_form="offers">
 6          <variant name="offers"/>
 7          <variant name="good price"/>
 8          <variant name="discounts"/>              ──── 802
 9       </entity_name>
10    </entity_category>
11
12    <entity_category name="problem">
13       <entity_name standard_from="problem">
14          <variant name="television speaker are not working"/>
15          <variant name="remote is not working"/>   ──── 804
16          <variant name="television is not switching on"/>
17       </entity_name>
18    </entity_category>
19
20
21
22    <entity_category name="products"
23       <entity_name standard_forms="products">
24          <variant name="television"/>
25          <variant name="laptop"/>
26          <variant name="televisions"/>             ──── 806
27          <variant name="laptops"/>
28       </entity_name>
29    </entity_category>
30
31    <entity_category name="brand">
32       <entity_name standard_form="brand">
33          <variant name="sony"/>                    ──── 808
34          <variant name="Samsung"/>
35          <variant name="dell"/>
36
37       </entity_name>
38    </entity_category>
39
40
```

FIG. 8

REAL TIME ANIMATION GENERATOR FOR VOICE CONTENT REPRESENTATION

TECHNICAL FIELD

This description relates to rendering user interfaces.

BACKGROUND

Computer technology is often used to enhance or facilitate various types of human interactions. For example, an ability of computing technology to identify, access, and process data might be used in conjunction with display technology to provide otherwise-unavailable information, or information that would otherwise be untimely, to a participant in a human interaction.

For example, employees of a company might have voice conversations with customers or potential customers of the company, in order to facilitate transactions, provide customer support, or otherwise enhance a relationship between the customer and the company. In these and related scenarios, the types of computing technologies referenced above might be used, for example, to provide the employee with data regarding, e.g., inventory available for sale, troubleshooting techniques for solving problems being experienced by the customer, or other types of relevant data that might be useful in enhancing the interaction with the customer.

Nonetheless, existing computing technologies do not fully or adequately address difficulties and opportunities in these and other types of interactions. For example, existing technologies may not provide sufficiently accurate, complete, or timely information. As a result, opportunities to provide desired results may be lost, and/or associated costs (e.g., reduce customer satisfaction, or increased customer service budget) may be incurred.

SUMMARY

According to one general aspect, a computer program product is tangibly embodied on a non-transitory computer-readable storage medium and includes instructions. When executed, the instructions are configured to cause at least one computing device to receive, during a voice conversation, conversationally continuous voice input from at least a first participant of the voice conversation, and convert, during the voice conversation, the conversationally continuous voice input into text. The instructions, when executed, are further configured to cause the at least one computing device to analyze, during the voice conversation, the text to characterize content thereof, and render, using a graphical user interface displayed to at least a second participant of the voice conversation, a voice content animation that visually represents the characterized content and is repeatedly updated as new content is characterized during the voice conversation.

According to another general aspect, a method of executing instructions stored on a non-transitory computer-readable storage medium using at least one processor includes receiving, during a voice conversation, conversationally continuous voice input from at least a first participant of the voice conversation, and converting, during the voice conversation, the conversationally continuous voice input into text. The method further includes analyzing, during the voice conversation, the text to characterize content thereof, and rendering, using a graphical user interface displayed to at least a second participant of the voice conversation, a voice content animation that visually represents the characterized content and is repeatedly updated as new content is characterized during the voice conversation.

According to another general aspect, a system includes a front end application server configured to receive text obtained during a voice conversation by way of voice conversion of conversationally continuous voice input received from at least a first participant of the voice conversation, and further configured to provide the text to a back-end database system. The system includes a sentiment analyzer implemented at the back-end database system and configured to receive the text and characterize content thereof, including defining a sentiment associated with the voice input of the at least one participant, based on individual words and/or phrases thereof. The system further includes a rendering engine implemented at the front end application server and configured to render, using a graphical user interface displayed to at least a second participant of the voice conversation, a voice content animation that visually represents the sentiment and is repeatedly updated as new content is characterized during the voice conversation.

The details of one or more implementations are set forth in the accompanying drawings and the description below. Other features will be apparent from the description and drawings, and from the claims.

BRIEF DESCRIPTION OF THE DRAWINGS

FIG. 8 illustrates example pseudo code that might be used in an example implementation of the system of FIG. 3.

DETAILED DESCRIPTION

Figure 1:
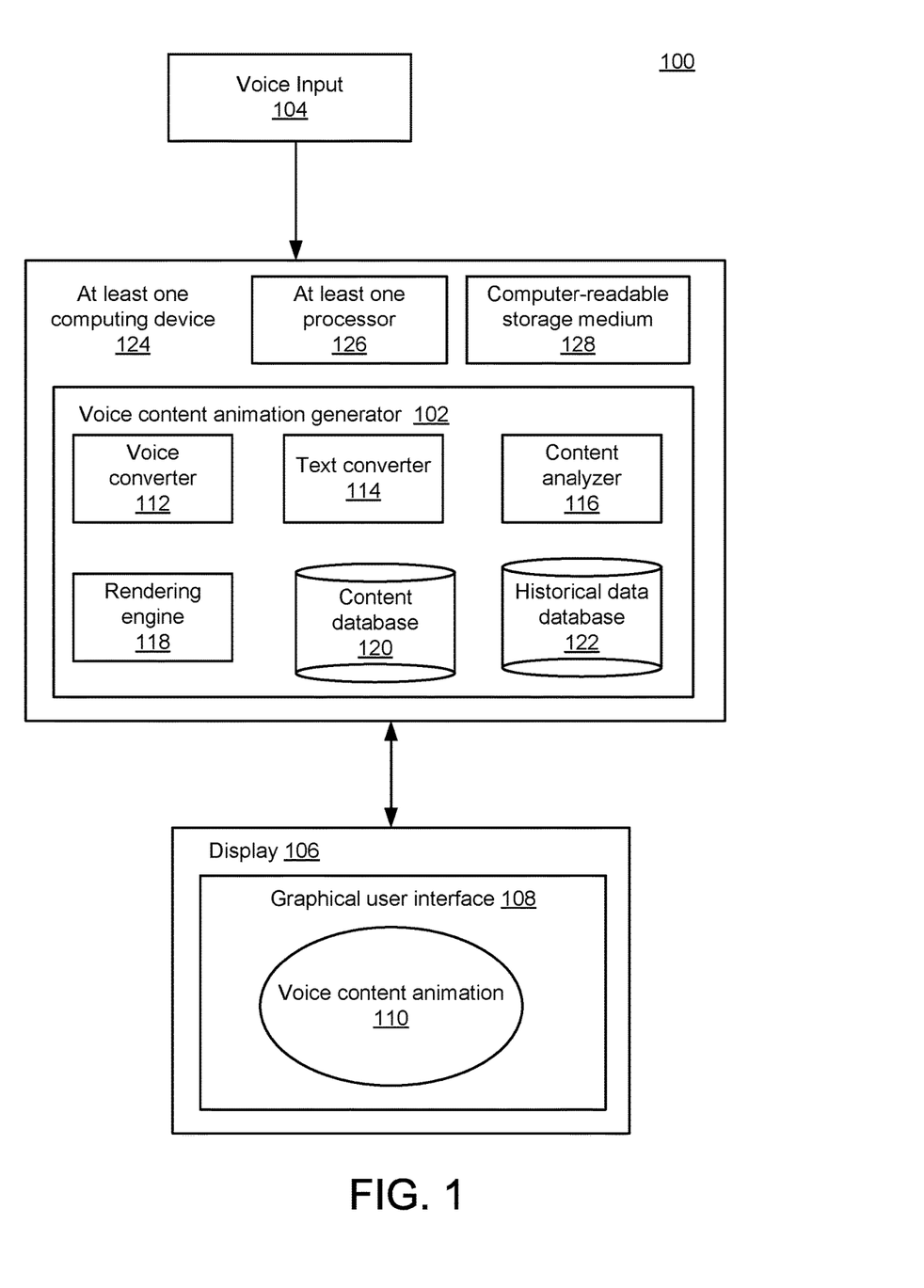
FIG. 1 is a block diagram of a system for real time voice content animation generation for voice content representation.

FIG. 1 is a block diagram of a system for real time voice content animation generation for voice content representation. In the example of FIG. 1, a voice content animation generator 102 is configured to receive voice input 104 in the context of a voice conversation between at least two conversation participants, and further configured to provide, by way of a display 106, and a graphical user interface 108, a voice content animation 110. As described in more detail below, the voice content animation 110 provides a visual, real-time, dynamic characterization and representation of the voice input 104, which might be provided in conjunction with supplemental or other relevant information. Thus, the voice content animation 110 is capable of enhancing and facilitating the conversation associated with the voice input 104, and increasing a likelihood or frequency of such conversations resulting in desired results or accomplishments.

In the example of FIG. 1, the voice input 104 should be understood to represent, for example, virtually any conversational voice input that might be captured using suitable telephonic or computing technology. For example, the voice input 104 might be captured during the context of a telephone conversation between two participants, or using voice over IP (VOIP) technology when communicating over a computer network, such as the public internet.

Of course, the voice input 104 also may be captured in the context of conversations involving more than two participants, such as during a conference call. In some example implementations, some or all of the participants may be remote from one another. In other example implementations, however, two or more of the participants may be co-located. In the latter examples, the voice input 104 may simply be recorded for processing using suitable recording equipment that is also co-located with the conversation participants. Of course, the above examples, and other more specific examples of the voice input 104 provided below should be understood to represent example, non-limiting instances of the voice input 104, and other types of the voice input 104 that might be used with the system 100 of FIG. 1 would be apparent to one of skill in the art.

Similarly, the display 106 and the graphical user interface 108 should be understood to represent virtually any type of suitable display or interface that might be used in the context of the system 100 of FIG. 1. For example, the display 106 might represent a monitor or other screens of a desktop, tablet, notebook, or netbook computer. In other implementations, the display 106 might be implemented using a smaller and/or more portable device, such as a smartphone, or various types of wearable technology. Consequently, the graphical user interface 108 should be understood to represent any type of application designed for visual renderings in the various computing context just referenced. For example, the graphical user interface 108 may represent any private or special purpose browser application, as well as any of the current or future publicly-available browser applications, such as Chrome by Google Inc., Internet Explorer by Microsoft, Firefox by Mozilla, or Safari by Apple.

In operation, as referenced above and described in detail below, the voice content animation generator 102 is configured to provide the voice content animation 110 in a manner that is highly adaptable and configurable for any of the various implementation examples just described. For example, in scenarios in which the conversation participants are conversing with one another remotely by way of a VOIP connection, the voice content animation 110 may be provided using a display of one or both of the computers being used to execute the VOIP connection.

As also described, the voice content animation 110 provides real-time, meaningful, visual assistance to at least one of the conversation participants. In this regard, as described below, the term content in the voice content animation 110 should be understood to refer not only to the literal words of the voice input 104, but also to characterizations thereof, including characterizations of a meaning, context, sentiment, significance, relevance, or other aspect of the voice input 104, or other types of meta-analysis thereof. Consequently, the viewer of the voice content animation 110 may be equipped and enabled to respond to all such aspects of the voice input 104 being visually animated and provided in this way.

In order to provide these and related features, the voice content animation generator 102 may include a voice converter 112 that is configured to receive the voice input 104 and convert the voice input 104 into text. That is, the voice converter 112 is configured to provide literal transcription of the voice input 104, and to do so on a continuous, dynamic, or real-time fashion. In various implementations, some of which are referenced below with respect to the example of FIG. 3, the voice converter 112 may be implemented using one or more suitable voice-to-text application program interfaces (APIs), or other suitable techniques.

Further in the example implementation of the voice content animation generator 102, a text converter 114 may be configured to receive converted text from the voice converter 112, for subsequent characterization thereof. In other words, as referenced above, the text converter 114 may be configured to determine meta-information characterizing a substance, meaning, or other content of the received, transcribed text. For example, the text converter 114 might determine a semantic or contextual meaning of one or more words or phrases having a plurality of potential meanings. In other examples, the text converter 114 may be configured to make inferences or predictions regarding an emotion, feeling, or other sentiment likely to be associated with a speaker of the text being characterized, along with an extent or degree of the sentiment in question.

In particular implementations, some of which are described in more detail below, the text converter 114 may utilize a dictionary, including a custom dictionary that has been designed with respect to a particular, predefined purpose or goal of the voice content animation generator 102. In additional or alternative implementations, the text converter 114 might use various types of machine-learning algorithms to train a classification model using historical, relevant data obtained from previous conversations, so that the resulting classification model may then be used by the text converter 114 to make current, real-time predictions regarding characterizations of the content of the current text obtained from a current, ongoing conversation.

Content obtained from the operations of the text-to-content conversion operations of the text converter 114 may then be analyzed by a content analyzer 116. In general, the content analyzer 116 may be understood to provide analysis that facilitates a particular use or type of use of the obtained content.

For example, if the characterized content reflects a positive sentiment associated with a conversation regarding a particular product for sale, then the content analyzer 116 might generate suggestions for potential sales of that type of product. Conversely, if a negative sentiment, such as might be characterized during a discussion of a potential repair is detected with respect to the same product or type of product, the content analyzer 116 may be configured to provide analysis that facilitates troubleshooting techniques for the relevant scenario. Additional example operations of the content analyzer 116 are described in more detail below, or would be apparent.

As text and other content, and analyses thereof, are provided by the voice converter 112, the text converter 114, and the content analyzer 116, a rendering engine 118 may be configured to render the voice content animation 110 based thereon. Various specific rendering techniques may be utilized by the rendering engine 118, some of which are described in detail below, or would be apparent. In general, however, it will be appreciated from the present description that the rendering engine 118 is configured to generate the voice content animation 110 in a manner that is considered timely within the context of providing feedback regarding the conversation in question.

For example, in the examples of FIGS. 5 and 6, below, the voice content animation 110 might be provided as a meter of varying sorts, in which values for one or more types of characterized content are visually updated in real-time as the conversation progresses. In other example implementations, the voice content animation 110 may include changing visual images of suggestions designed to facilitate accomplishment of the goal of the conversation being conducted.

During operation, the voice content animation generator 102 may access, generate, process, or otherwise utilize various types of data. In the example of FIG. 1, such data is represented generally by content database 120 and historical data database 122.

The content database 120 represents any text obtained from the voice converter 112, characterizations of such text obtained from the text converter 114, analyses of any such characterized text obtained from the content analyzer 116, and any other type of content that may be useful in generating the voice content animation 110. Although illustrated for purposes of the example of FIG. 1 as a single database, it will be appreciated that the various types of data just referenced, and other relevant types of data, may be stored using two or more separate, individual databases.

Meanwhile, the historical data database 122 generally represents any data that may be useful for operations of the text converter 114, the content analyzer 116, the rendering engine 118, or any other component of the voice content animation generator 102, including those not specifically illustrated in the simplified example of FIG. 1. For example, as described in detail below with respect to FIGS. 3-8, the historical data stored in the database 122 may include previously-converted and analyzed voice, text, content, and/or analysis. In this way, such historical data may be utilized to supplement or inform current operations of the voice content animation generator 102.

As with data within the content database 120, historical data illustrated as being stored using the single database 122 in FIG. 1 may be stored using two or more separate, individual databases. Further, in some implementations, content initially stored within the content database 120 may be relocated for longer term storage using the historical data database 122, such as when content data related to a current conversation associated with the voice input 104 is moved to the historical data database 122 at the conclusion of the conversation in question.

In the example of FIG. 1, the voice content animation generator 102 is illustrated as being executed using at least one computing device 124, which itself is illustrated as including at least one processor 126, as well as a non-transitory computer readable storage medium 128. Thus, in example implementations, the voice content animation generator 102 may be executed using two or more computing devices in network communications with one another. Similarly, the at least one processor 126 might represent two or more processors executing in parallel in the context of one or more computing devices.

Consequently, the voice content animation generator 102 may be implemented in whole or in part using one or more computing devices. For example, one or more of the components 112-122 may be executed in a different computing device than a remaining one or more of the components 112-122. For example, as described and illustrated below in detail with respect to FIG. 3, the voice content animation generator 102 may be implemented using a combination of a front end architecture and back end architecture in communication with one another.

Further, although the various components 112-122 are illustrated as separate, discrete components, it will be appreciated, as referenced above, that any one of the components 112-122 may be implemented as two or more individual sub-components. Conversely, in some implementations, two or more of the components 112-122 may be combined for implementation as a single component.

Still further, individual components of the components 112-122 may be implemented using different hardware or software. For example, the content database 120 may be implemented using a main memory or in-memory database, while the historical data database 122 may be implemented using a longer term/relatively less expensive, disk-based storage medium.

Figure 2:
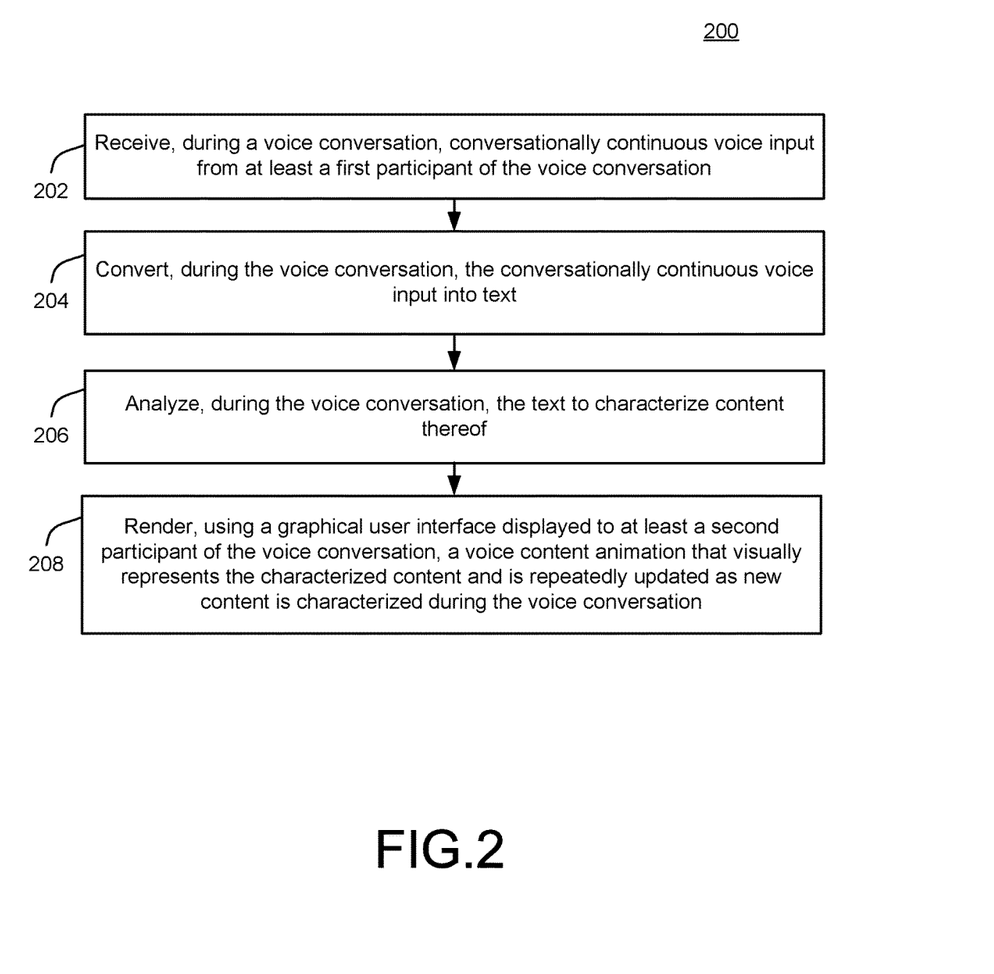
FIG. 2 is a flowchart illustrating example implementations of the system of FIG. 1.

FIG. 2 is a flowchart 200 illustrating example operations of the system 100 of FIG. 1. In the example of FIG. 2, operations 202-208 are illustrated as separate, sequential operations. In various implementations, additional or alternative operations or sub-operations may be included, and/or one or more of the operations 202-208, or sub-operations thereof, may be omitted. Further, any two or more of such operations or sub-operations may be executed in a partially or completely overlapping or parallel manner, or in a nested, iterative, looped, or branched fashion.

In the example of FIG. 2, during a voice conversation, conversationally continuous voice input may be received from at least the first participant of the voice conversation (202). For example, the voice converter 112 may be configured to receive the voice input 104 in the context of a particular voice conversation, such as those referenced above, and/or described in more detail, below. In this context, it will be appreciated that the conversationally continuous voice input should be understood to represent the type of audible or audio data that might typically occur during a voice exchange between two or more participants regarding one or more topics. For example, the voice input might include or experience the types of interruptions, delays or pauses that may occur during the normal course of making conversation, and is synchronous in the sense that at least one participant, for example, typically waits for a response from one or more other participants, while still being at least partially engaged with the voice conversation in question. For example, as described in detail in various examples below, such conversationally continuous voice input might be presumed to occur in scenarios in which a customer call service representative receives a customer call regarding a particular service or product of interest to the customer.

Due to the conversationally continuous, synchronous aspects of such voice conversations, responses from any participant, but particularly from any participant seeking to provide a service to one or more of the other participants, should be timely and well-informed. Participants, particularly those participants requesting a service or product, may not have the desire or the patience to wait for necessary information to be obtained or analyzed. Moreover, even if some such time were available, it may still be difficult for a participant attempting to provide a service or product to obtain the correct and complete information that is required.

Consequently, as already described above with respect to FIG. 1, also during the conversation, the conversationally continuous voice input may be converted into text (204). For example, the voice converter 112 may be configured to convert the received voice input 104 into corresponding texts, in a manner that is conversationally continuous in the same sense as just described with respect to the reception of the voice input itself. In other words, the voice-to-text conversation occurs, along with remaining operations of the voice content animation generator 102, at a speed, frequency, and other manner consistent with providing the voice content animation 110 in the context of the voice conversation.

Also during the conversation, the text may be analyzed to characterize content thereof (206). For example, the text converter 114 may be configured to analyze text converted by the voice converter 112, to obtain characterized text that may then be stored using the content database 120. As referenced above, and described in detail below, such characterization may include, for example, a determination of a relevant sentiment of the at least the first participant, or other metadata characterizing and expanding on the literal word of the converted text.

Using a graphical interface displayed to at least a second participant of the voice conversation, the voice content animation may be rendered that visually represents the characterized content, and is repeatedly updated as new content is characterized during the voice conversation (208). For example, the rendering engine 118 may generate the voice content animation 110, based on data obtained from the content database 120. In this way, the voice content animation 110 may be updated on a time scale that is consistent with providing the at least the second participant with characterized content, and supplemental data and analysis, in a manner that is sufficiently timely to assist the at least the second participant in accomplishing one or more goals associated with the voice conversation in question. Moreover, the voice content animation 110 accomplishes these and other objectives in a manner that is fast and intuitive.

Figure 3:
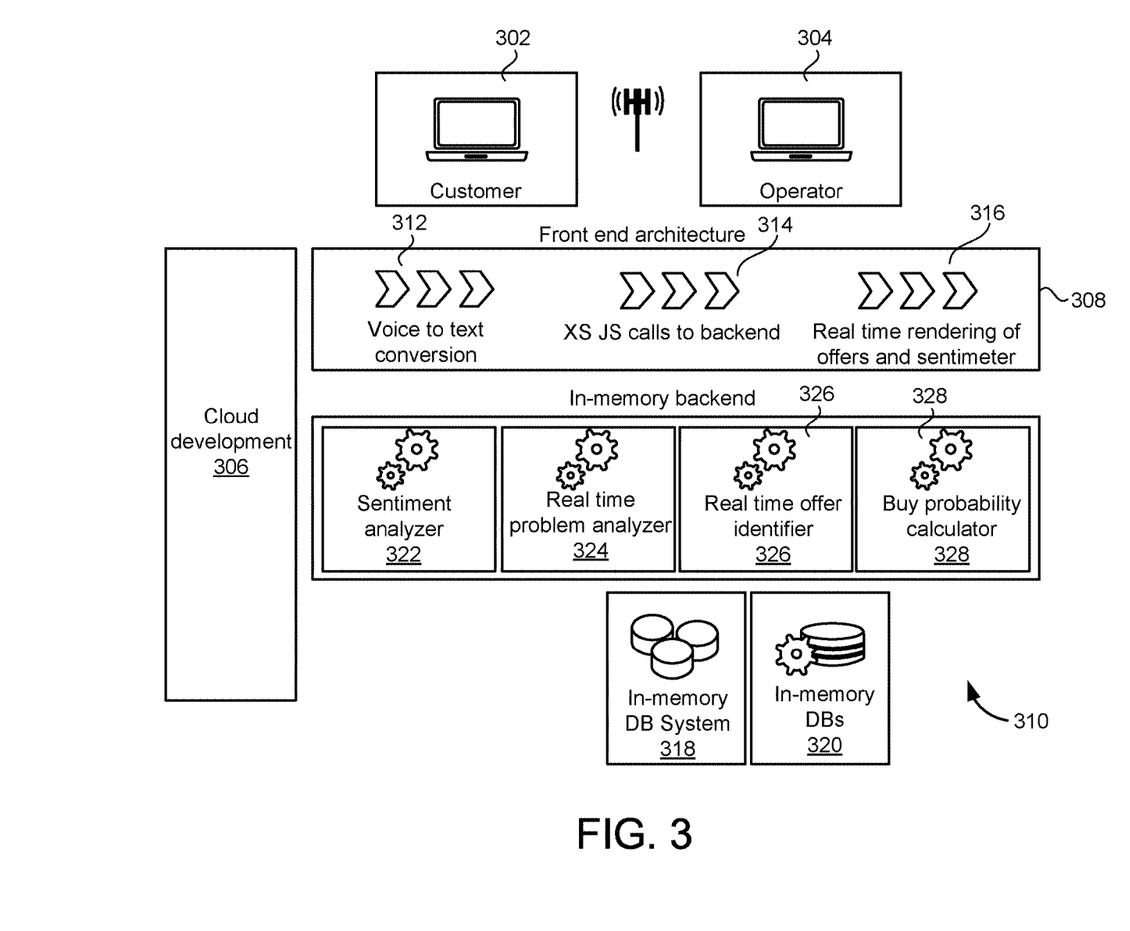
FIG. 3 is a block diagram of a more detailed example implementation of the system of FIG. 1.

FIG. 3 is a block diagram of a system 300 illustrating a more detailed example implementation of the system 100 of FIG. 1. In the example of FIG. 3, as well as in various associated examples illustrated and described with respect to FIGS. 4-8, example implementations are described in which a customer 302 conducts a voice conversation with an operator 304, such as may occur when a purchaser of a product or service contacts a call center operated by a provider of the product or service for assistance therewith.

During such conversations and related interactions, generally referred to herein as customer call center interactions, the customer 302 may have a difficulty with a specific product or service, or with previous customer service associated therewith. The operator 304 has an opportunity to resolve any such difficulties experienced by the customer 302, and thereby maintain high levels of customer satisfaction. Additionally, or alternatively, the customer 302 may be interested in making additional purchases or related transactions, and in these scenarios, the operator 304 will have the opportunity to facilitate consummation of such potential transactions.

In practice, however, it may be difficult or impossible for the operator 304 to fully take advantage of these opportunities. For example, the operator 304 may be required to handle a large volume of calls, under time pressure to resolve each call as quickly as possible. Further, the operator 304 may be required to have extensive knowledge regarding products and services that are available, as well as associated troubleshooting and repair knowledge. Still further, individual operators may experience particular challenges, such as having relatively low levels of experience, or being a non-native or non-fluent speaker of a language being used by the customer 302 during the conversation.

In order to address these and related concerns, and provide various associated features and advantages, the system 300 provides a cloud deployment platform 306 in which a front end architecture 308 facilitates interactions with both the customer 302 and the operator 304, while an in-memory back end 310 enables the types of real-time or near real-time data processing and analyses described above with respect to the voice content animation generator 102. For example, the front end architecture 308 may be configured to provide a first view to the operator 304, examples of which are illustrated and described below with respect to FIGS. 5 and 6. Meanwhile, the front end architecture 308 may also be configured to provide a second view to the customer 302, as illustrated and described below with respect to FIG. 7.

During operation, the front end architecture 308 is configured to receive voice input of the voice conversation between the customer 302 and the operator 304, for voice-to-text conversion 312. As shown, the voice-to-text conversion 312 may be executed at the front end architecture 308, and may be performed using an appropriate voice application program interface (API).

In the example of FIG. 3, as just referenced, the front end architecture 308 (including, e.g., one or more application server(s)) is configured to provide interactions with both the customer 302 and the operator 304, as well as the preliminary voice-to-text conversion 312. Meanwhile, the in-memory back end 310 is configured to provide all related data processing and analyses, including identifying and accessing relevant data. Consequently, the system 300, and similar implementations of the type of cloud deployment 306 illustrated in FIG. 3, may utilize one of a number of potential techniques for facilitating interactions between the front end architecture 308 and the in-memory back end 310.

For example, in the example of FIG. 3, XSJS calls 314 are illustrated as being made to the in-memory back end 310. In this context, XS refers to "extended application services," while JS refers to java script, so that the XSJS calls 314 may be understood to be asynchronous calls by an application server of the front end architecture 308. Additional example details regarding the XSJS calls 314 are provided below, as well as additional or alternative techniques for implementing communications between the front end architecture 308 and the in-memory back end 310.

For example, the front end architecture 308 might send XSJS calls at pre-determined intervals, such as every 5 seconds, or some other appropriate time interval. Additionally, or alternatively, he XSJS calls also might be sent in response to a detected event or other criteria, such as detection of a particular word. In other implementations, other techniques for communicating between the front end 308 and the back end 310 may be used, including, e.g., Odata (Open Data) techniques, or REST (REpresentational State Transfer) techniques.

In other implementations, web sockets may be used to open a channel or tunnel (using appropriate APIs) between the front end 308 and the back end 310, using a runtime environment such as node.js, to thereby send front-end data to the back end 310 and receive event-driven responses (e.g., successful, completed generation events of call content/characterization/sentiment data) therefrom, without having to specifically request data from each such event.

The in-memory back end 310 may perform various types of data processing and analyses, as may be generally understood from the above description of FIG. 1, and is described in more detail below. Upon completion of such data processing and analyses, the in-memory back end 310 returns, e.g., characterizations of voice content and associated analysis to the front end architecture 308, whereupon a real-time rendering 316 is provided (using, e.g., rendering tools such as SAPUI5, or HTML5).

In more detail, the real-time rendering 316 may provide additional offers for sale to one or both of the customer 302 and the operator 304. Further, the real-time rendering 316 may provide an example of the voice content animation 110 in the form of a "sentiment meter," or "sentimeter." As illustrated and described below with respect to FIGS. 5 and 6, such a sentimeter represents a quantification of a sentiment of the customer 302 during the voice conversation in question, including real-time changes in sentiment that may occur, or be detected, as the conversation proceeds. Again, as described below, the availability of this type of voice content animation may provide the operator 304 with a knowledge and awareness of a current, dynamic sentiment of the customer 302, and may be instrumental in enabling the various features and advantages referenced above with respect to the goals of the operator 304 in providing high quality customer service and maximizing sales of products and services.

In FIG. 3, various, non-limiting examples are illustrated with respect to the types of content characterization and analysis that might be performed during relevant scenarios. For example, a sentiment analyzer 322 may be configured to receive converted text from the voice-to-text conversion 312 and the XSJS calls 314, and use associated techniques to return an identification and quantification of one or more current sentiments of the customer 302 during the ongoing voice conversation.

A real-time problem analyzer 324 may similarly be configured to analyze text received by way of the XSJS calls 314, in order to identify specific problems or other difficulties that may be experienced by the customer 302. For example, the real-time problem analyzer 324 might be configured to identify a particular product or service, along with a specific malfunction being reported by the customer 302. Additionally, the real-time problem analyzer 324 may be configured to identify potential solutions for the difficulty being experienced.

A real-time offer identifier 326 may be configured to analyze product or service data, to thereby determine specific additional products or services that may be of interest to the customer 302. In conjunction with the real-time offer identifier 326, a by probability calculator 328 may be configured to calculate a probability of purchase associated with each identified offer, for the customer 302 in question.

In order to implement and support the various operations of the components 322-328, the example of FIG. 3 illustrates use of an in-memory database system 318, such as the HANA in-memory database system of SAP SE of Waldorf, Germany. Generally speaking, in such in-memory of main memory database systems, data is stored within a volatile, high speed main memory, and operations of the associated in-memory database system 318 may be configured and optimized to access data in this context, including taking full advantage of the types of high speed data access that are available.

Accordingly, in the example of FIG. 3, relevant data is illustrated as being stored using in-memory databases 320. It will be appreciated that various types of in-memory database systems may be used. Additionally, or alternatively, it is possible to implement the system 100 of FIG. 1 without requiring the use of an in-memory database, and instead utilizing disk-based storage.

Figure 4:
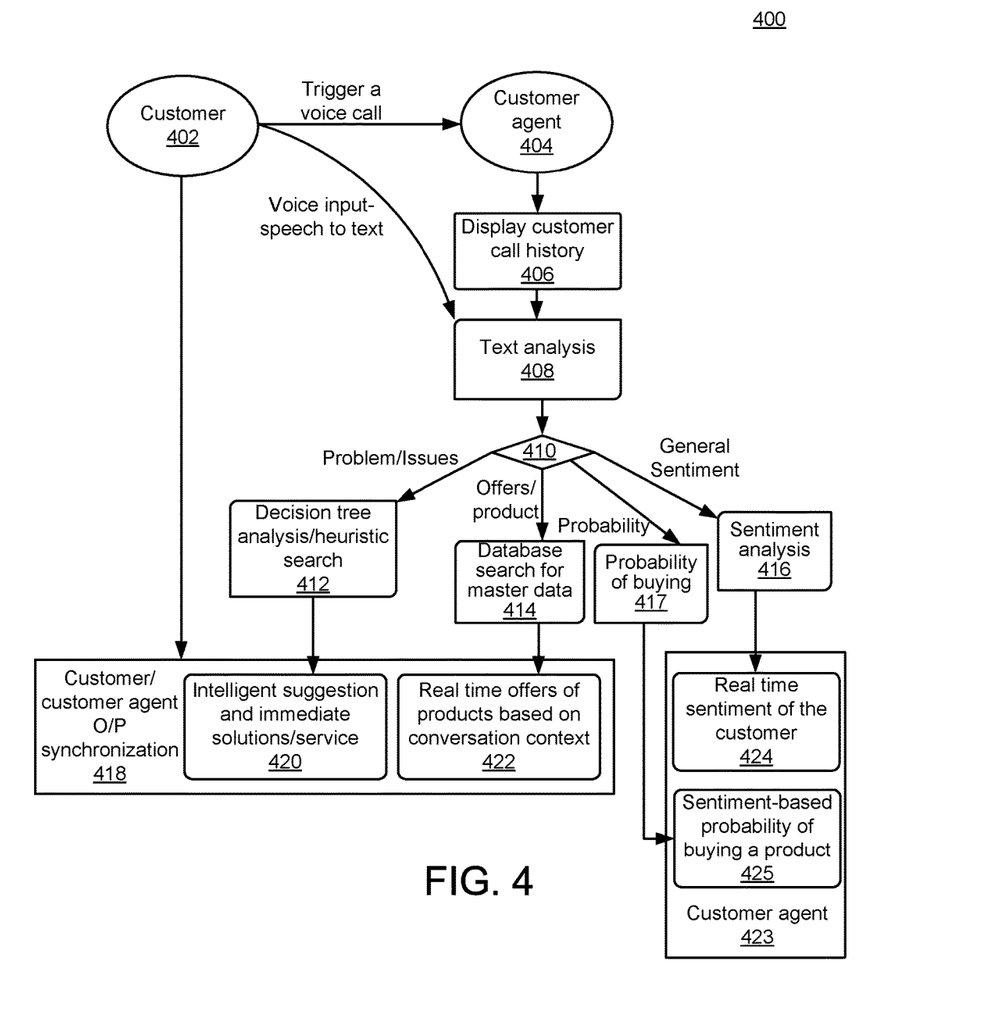
FIG. 4 is a flowchart illustrating example operations of the system of FIG. 3.

FIG. 4 is a flowchart 400 illustrating detailed example operations of the system 300 of FIG. 3. In the example of FIG. 4, the process begins when a customer triggers a voice call, e.g., of the various types referenced above, to a customer agent 404, such as the operator 304 of FIG. 3. In this regard, as referenced above and described and illustrated in detail below with respect to FIG. 7, the customer 402 may initially be provided, by way of the front end architecture 308, with a view of a graphical user interface in which a call button is available for contacting the customer agent 404.

As the customer agent 404 receives the voice call, the customer agent 404 may initially be provided, by way of the front end architecture 308, with a separate, potentially overlapping, view within the context of a separate graphical user interface of the customer agent 404. In example implementations, the customer agent 404 may initially be provided with a display of a customer call history (406) for the customer 402 in question.

In other words, for example, the historical database 122 and/or the various ones of the in-memory databases 320 of FIG. 3 may be utilized to store information regarding previous customer calls from the customer 402. Such call history may include information such as a timing, nature, or content of one or more previous calls, including specific products or services that were subjects of such previous calls.

Further, it will be appreciated that such call history data may leverage previous operations of the voice content animation generator 102 that may have been performed during the context of each previous call, and that was subsequently stored for later use at the conclusion of each such call. In this way, for example, the customer agent 404 may initially be provided with information regarding previous sentiments of the customer 402, a current status or update relevant to previous requests, and/or call transcript information, or any other relevant historical data that may be of assistance in determining the relevant history of the customer 402, and/or in setting the context for the current conversation.

Concurrently, text analysis (408) based on received voice input having been converted to text may proceed. At a decision point (410), and depending on a current content of the received text, various additional, subsequent operations and analysis may occur. For example, for detected problems/issues being determined to be associated with the customer's call, a decision tree-based analysis, or heuristic search, may be conducted (412). If a specific offer and/or product is detected as being discussed, then a database search for relevant master data for the offer/product may be conducted (414). Meanwhile, words or phrases related to a general sentiment of the customer 402 during the voice conversation may be used to trigger a sentiment analysis (416). Further, calculations for determining a probability of purchasing a specific product/service, or a type of product/service, may be executed, based on the sentiment analysis.

In the example of FIG. 4, a block 418 references a real-time rendering, such as may be implemented by the rendering engine 114 of FIG. 1, or the real-time rendering 316 of FIG. 3, and that may be provided in whole or in part to one or both of interfaces being viewed by the customer 402 and the customer agent 404 (e.g., in a synchronized manner). Specifically, intelligent suggestions and immediate solutions/services may be provided (420), based on output of the decision tree analysis/heuristic search having already been performed (412). Similarly, real-time offers of products, based on conversation context, may be provided (422), based on the previous database search (414).

Finally in FIG. 4, a real-time sentiment of the customer may be provided (424), based on the previous sentiment analysis (416), and may be displayed only to the customer agent 404 (423). Specifically, as described, the real-time sentiment may be displayed as a voice content animation that is visually updated in a progressive or accumulative manner as the voice conversation between the customer 402 and the customer agent 404 continues. Further, rendering of the calculated probability of purchase of a product or service also may be executed (425).

Figure 5:
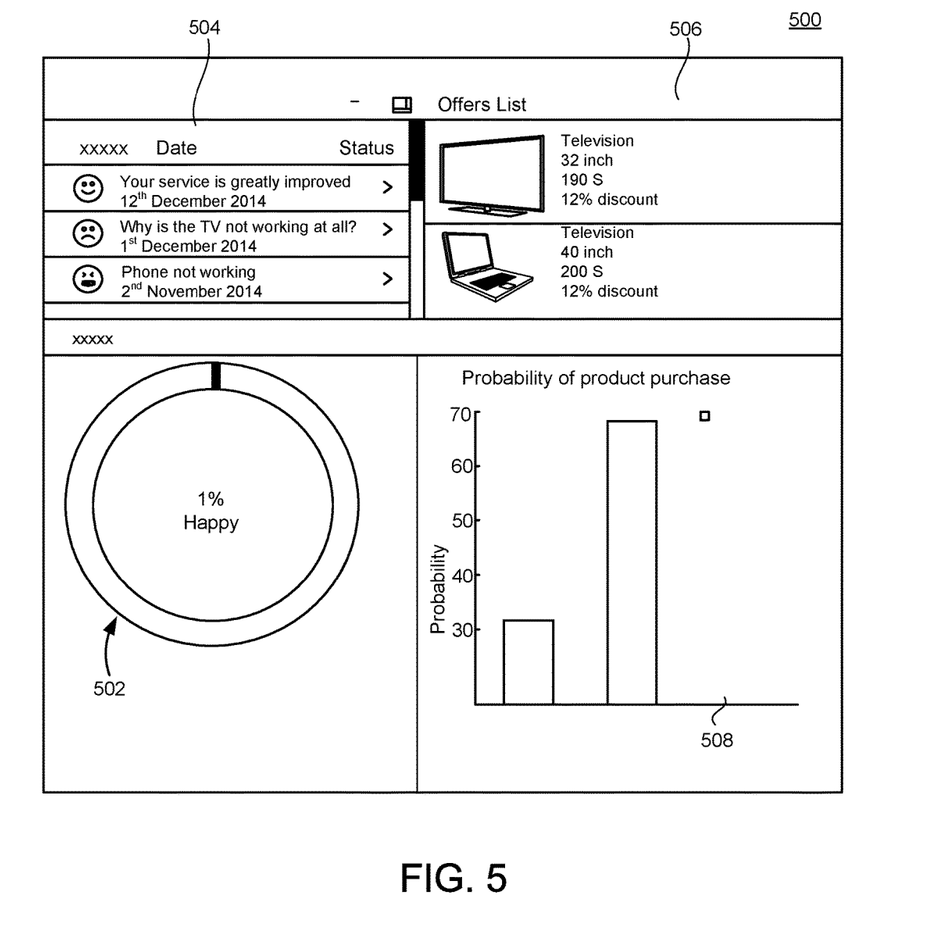
FIG. 5 is a first example screenshot of a screen that might be produced by the systems of FIGS. 1 and 3.
Figure 6:
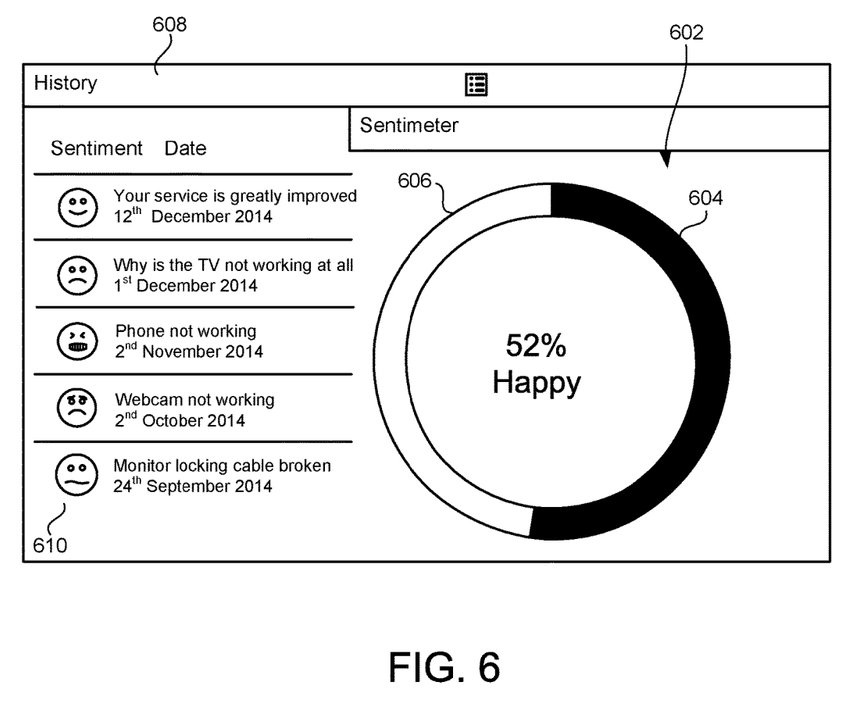
FIG. 6 is an example screenshot of an updated portion of the screenshot of FIG. 5.

FIG. 5 is a first example screen shot 500 of a graphical user interface that might be rendered for a customer service agent, such as the customer agent 404 of FIG. 4, or the operator 304 of FIG. 3, and FIG. 6 illustrates an updated portion of the screen shot 500 that might be rendered at a later time during the same conversation with the same customer of FIG. 5. In the example of FIG. 5, element 502 illustrates an example of the "sentimeter" referenced above with respect to FIGS. 3 and 4.

As shown, and as referenced above, the sentimeter 502 illustrates the customer's average level of happiness, satisfaction, frustration, or other sentiment or emotion. As an example or instance of the voice content animation 110, the sentimeter 502 should be understood to be a visual animation that is updated throughout the course of the conversation with the customer, in order to reflect the customer's current sentiment. In the example of FIG. 5, the sentimeter 502 operates like a speedometer, and updates a portion or percentage of the animation each time the value or quantity of the sentiment is determined to have changed.

In an initial instance, as referenced above with respect to operation 406 of FIG. 4, a portion 504 illustrating a call history of calls previously conducted with the customer in question may be displayed. Moreover, an initial or starting value for the sentimeter 502 may be set based on the previous call history. For example, the value for the sentimeter 502 may be based on one or more of the calls that are most recent, may be based on one or more of the calls that are most relevant to the current call, and/or may be based on an aggregation of sentiment values for one or more such calls, or for all calls in the customer's history.

In operation, upon call receipt, call history tables may be queried for the customer to retrieve the relevant history. An average sentiment and summary of each call may be displayed. At the end of each call, the transcript and the average sentiment may be saved back to the history table(s).

Although FIG. 5 illustrates the single sentimeter 502, other implementations may include two or more sentimeters. For example, sentimeters expressing different emotional states may be displayed and updated together. In some cases, a sentimeter may be displayed in conjunction with a particular topic (e.g., product, or service call), while another sentimeter may be displayed in conjunction with another topic. In a specific example, a customer may be happy with the operation of a particular product, but unhappy with a behavior of a technician who came to upgrade the product.

Further in FIG. 5, a portion 506 provides real-time offers that have been calculated to be relevant for purchase by the customer, while a portion 508 provides a probability of purchase of one or more of the products in the section 506. Not specifically illustrated in FIG. 5, but illustrated and described below with respect to FIG. 7, the screen shot 500 also may include suggested resolutions, troubleshooting techniques, or other solutions for one or more difficulties being experienced by the customer.

As already described with respect to the sentimeter 502, it will be appreciated from the above description that the portions 506, 508, as well as any portion dedicated to providing potential solutions for customer problems, may be updated dynamically, as part of, or examples of, the voice content animation 110 of FIG. 1. In other words, for example, the portion 506 does not simply provide a product or products that are thought to be relevant for purchase by the customer. Rather, the portion 506 illustrates a best-available current prediction for such products at a given point in the conversation, based on the content of the conversation, and potentially on the previous call history of the customer. As the conversation proceeds, the portion 506 may be dynamically updated to reflect new, best-available current predictions.

For example, at the beginning of the call, the customer might mention a television, and the portion 506 might provide suggestions for television purchases. Later in the same call, the customer might discuss products associated with making an existing television internet-ready, so that the portion 506 might be dynamically updated to reflect the fact that the customer is not interested in purchasing a new television, but rather is interested in purchasing products associated with making an existing television internet-ready.

Similarly, the portion 508 may be dynamically updated to reflect probabilities of purchase for the products displayed in the portion 506. The probabilities of the portion 508 may be updated, e.g., based on current content of the voice conversation, aggregate content of the voice conversation, as well as the call history displayed in portion 504.

As referenced above, FIG. 6 illustrates an updated example of the sentimeter 502, illustrated as sentimeter 602. As shown, in the example of FIG. 6, the sentimeter 602 has been updated during the voice conversation to reflect a portion 604 illustrating 52% level of happiness or satisfaction for the customer, while a remaining portion 606 illustrates a 48% level of dissatisfaction.

Again, the sentimeter 602 should be understood to represent the high speed, dynamic, real-time, or near real-time manner in which voice content animations provided by the systems 100 and 300 may update during the course of a voice conversation. For example, the sentimeter 602 might change rapidly to reflect a sudden level of frustration experienced by the customer, so that the sentimeter 602 might be rapidly updated to reflect, e.g., 75% frustration of the customer.

Of course, many different types of sentiments or other characterizations of the customer and the voice content might be provided using the sentimeter 602. Example implementation details for providing the sentimeters 502, 602 are described below, e.g., with respect to FIG. 8.

In general, however, it will be appreciated that knowledge of the customer sentiment may be extremely valuable to the customer service agent. For example, the customer service agent, without the benefit of the sentimeter 602, might not recognize a type or extent of sentiment experienced by the customer at a given point in time. Moreover, with the sentimeter 602, the customer service agent may be provided with scripted or suggested language for responding to the customer. For example, in scenarios in which a customer is angry or frustrated, the customer service agent may be provided with suggested language to respond to the customer in such scenarios.

Further, and similarly, it will be appreciated that other portions of the graphical user interface provided or rendered for the customer service agent may be updated in conjunction with the sentimeter 502, 602. For example, with respect to FIG. 5, the probability of product purchase shown in portion 508 may be updated in this manner, such as when a probability of any purchase is increased in conjunction with increases in perceived happiness or satisfaction calculated in conjunction with the sentimeter 502, 602.

Further in FIG. 6, a portion 608 illustrates a slightly expanded view of the portion 504 of FIG. 5, in which the customer's call history is displayed. As seen more clearly in FIG. 6, a number of pass calls may be displayed, along with an initial or high level summary of the content of the call, a date of the call, and, as illustrated by graphic 610, a visual representation or description of a general sentiment or sentiments associated with each call. For example, the sentiment graphic 610 might represent an average sentiment calculated for the corresponding call. Further, the customer service agent may be enabled to select any one of the calls, in order to be provided with more details regarding the call in question. In general, it will be appreciated that the portion 608 assist the customer service agent by setting a context for the customer in question at the very beginning of the current voice conversation.

Figure 7:
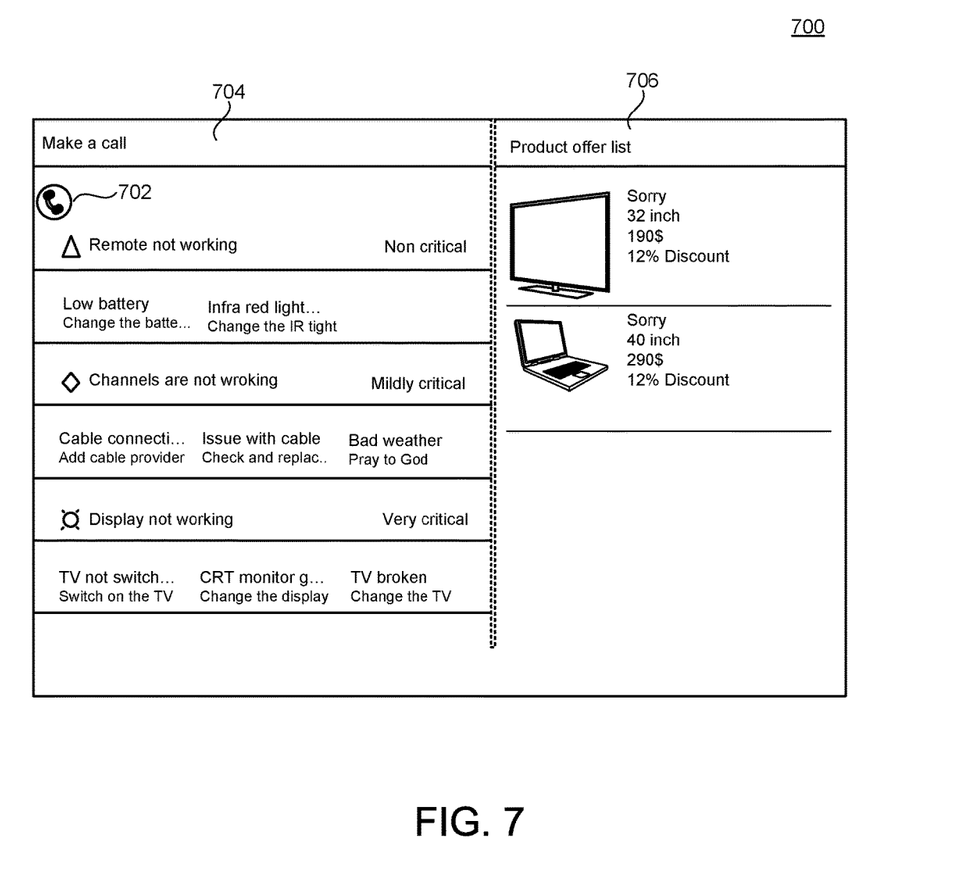
FIG. 7 is another example screenshot of a screen that might be produced by the systems of 1 and 3.

As referenced above, FIG. 7 is a screen shot 700 illustrating an example graphical user interface that might be presented to the customer during the voice conversation with the customer service agent. As shown, a call button 702 might enable the customer to initiate a voice over IP voice conversation with the customer service agent. Meanwhile, a portion 704, as also referenced above, illustrates examples of potential resolutions, troubleshooting techniques, or other solutions that might assist the user with a problem being experienced in conjunction with the current voice conversation.

Finally in FIG. 7, a portion 706 illustrates real-time product offers of products that may be of interest to the customer. As illustrated, the portion 706 may correspond generally or specifically to the portion 506 of FIG. 5 that is displayed to the customer service agent. In other words, the portions 506, 706 generally illustrate the type of synchronized display that may be rendered for both the customer and the customer service agent.

By displaying the potential solutions of the portions 704 and the offered products of the portions 706, the customer is enabled to provide a feedback loop which is likely to result in reaching desired outcomes more quickly and more efficiently. In other words, as the customer speaks, the customer will see corresponding updates to the portions 704, 706 in real-time, where such updates also may reflect comments made by the customer service agent, as well. As a result, the customer may respond to the updated display with additional voice input, where such voice input will immediately be analyzed and reflected within one or both of the portion 704, 706.

For example, in a specific use case scenario as referenced above, a customer may initially call in and discuss an inability of his or her television to connect to the internet. In response, the screen shot 700 might provide potential repairs to internet-ready TVs that are not receiving the internet, and/or the portion 706 might display internet-ready televisions that are for sale. Upon seeing either or both of the recommended solutions and/or the internet-ready televisions for sale, the customer may recognize that his or her situation has not been perceived correctly, and may proceed to clarify that he or she is not looking to purchase or repair and internet-ready TV, but rather is interested in purchasing adapters or other technology to enable the customer's existing television to connect to the internet. Upon receiving this additional voice input, the portions 704, 706 may be immediately updated, without any action being required on the part of the customer service agent, and even if the customer service agent was also under the impression that the customer wished to purchase a new internet-ready television.

In these and other techniques and aspects, customers may be provided with potential solutions quickly. Again, by seeing such potential solutions being displayed within the portion 704, the customer may provide feedback regarding the types of solutions being provided, so that the customer service agent more quickly understands the type of problem being experienced. In other scenarios, the customer might receive a satisfactory solution from its display within the portion 704, even if the customer service agent was not aware of the potential solution, and even if the customer service agent did not fully understand the nature of the problem being experienced.

In providing the type of quick fix dashboard described above with respect to the portion 704 of FIG. 7, it will be appreciated that this approach may be extended with respect to any documentation, customizing details, frequently asked questions (FAQ), topics, social network references, or any other information that may be useful in reducing a latency of providing potential customer solutions. In all such cases, content for the portion 704 may be determined, e.g., by assessing the type of conversation or statement, identifying a problem/issue as having been mentioned, and then searching one or more internal databases for specific solutions corresponding to the problem/issue. In addition to providing these results to the current customer, the results may be saved for subsequent in enhancing or enabling heuristic learning, such as when using machine-learning algorithms to assess and provide solutions for customers.

Thus, FIGS. 5-7 illustrate that potential quick fixes and product offers represent a more general ability of the systems of FIGS. 1 and 3, e.g., to identify a potentially-available database record (e.g., here, for assisting the customer), and then executing a search for the database record within a corresponding database to obtain search results (such as the databases 120, 122 of FIG. 1). As a result, the obtained database records (search results) may be rendered as part of a voice content animation, including updating the search results and the voice content animation when a second potentially-available database record is identified and searched.

FIG. 8 and additional discussion below provide further example implementation details for the systems 100 of FIG. 1 and 300 of FIG. 3. For example, FIG. 8 provides a customizable text-to-dictionary that may be used in characterizing the words and content of received voice input.

For example, as shown, FIG. 8 illustrates the portion 802 associated with characterizing the providing of offers in conjunction with the portion 506 of FIG. 5 or 706 of FIG. 7. A portion 804 illustrates different examples of problems that might be identified based on the received voice input, and such as may be displayed in the context of the portions 504, 608, or 704.

A portion 806 provides examples of products that might be recognized, while a portion 808 illustrates examples of specific brands of products that might be recognized. Accordingly, the products illustrated in the portions 506, 706 may be displayed by type and/or brand, as preferred.

In further example implementations, the sentimeters 502, 602 may be developed using a java script library to produce a type of dynamic, interactive visualization or animation described above, such as a D3.js library. Using such a java script library, or other suitable technique, a current value for a current sentiment may be determined, and interpolated for display using the sentimeters 502, 602.

For example, once real-time speech input is received as text, a corresponding text engine, such as the text converter 114 or the sentiment analyzer 322, along with the type of custom dictionary illustrated and described with respect to FIG. 8, may be configured to analyze the text to make a decision regarding a perceived positive or negative sentiment. Then, a suitable weight may be assigned to each sentiment based on its calculated intensity, and a corresponding value or values may be passed for display on a corresponding GUI, e.g., using the type of XSJS service described above with respect to the front end architecture 308 of FIG. 3 (i.e., the XSJS calls 314).

For example, index tables may be constructed or utilized to assess a nature and weight of each word or statement, including custom dictionaries that may be constructed for particular implementations of the systems 100/300. Then, using the weight of the current statement or other voice input, and with an average sentiment set to zero, a percentage sentiment (e.g., happiness) may be calculated, and an average sentiment may be updated with the current sentiment, as shown in equation 1:

$$\% \text{ Happiness}=(\text{Average Sentiment}+(\text{weight of the expression or statement}))/n \quad \text{Equation 1}$$

In Equation 1, n equals a total number of determined changes in sentiment (with a default or beginning value set to a value of 1), and the "average sentiment" is calculated in a manner just referenced.

In similar detail regarding generation of the probability of product purchase (e.g., 508 in FIG. 5), it will be appreciated that the probability is calculated at least in part based on a determined sentiment of the customer. For example, the more positively a customer references a particular product, the higher the probability of purchase will be. The probability may thus be calculated using Equation 2:

$$\text{Weight}(i)=(\text{weight of statement})+\text{Previous weight}$$
$$\text{Probability}(i)=(100/\Sigma \text{Weight})*\text{Weight}(i) \quad \text{Equation 2}$$

In Equation 2, "i" references each product, while the previous weight factor references a previously calculated weight (with an assumed beginning value of 0).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

receive, during a live voice conversation, conversationally continuous voice input from at least a first participant of the voice conversation;

convert, during the live voice conversation, the conversationally continuous voice input into text in real-time;

select at least a portion of the text;

trigger, based on the selected portion of the text, a real-time analysis of a sentiment of the first participant in the text;

analyze, during the live voice conversation, the text using machine learning, to characterize content thereof, the characterization including a determination of whether a specific offer of a product or service is being discussed and a determination of a sentiment of the first participant during the live voice conversation;

determine, based on the sentiment of the first participant during the live voice conversation, a probability of the first participant accepting the specific offer of the product or service discussed;

render, using a first graphical user interface displayed to at least a second participant of the live voice conversation, a voice content animation that visually represents the characterized content, the visual representation of the characterized content including a representation of the sentiment of the first participant and a representation of the probability of the first participant accepting the specific offer of the product or service discussed during the live voice conversation;

transmit data to the first participant for generating a visual representation of the specific offer of the product or service discussed during the live voice conversation on a second graphical user interface to be displayed on a computing device of the first participant, wherein the visual representation displayed on the first graphical user interface is synchronously displayed with the visual representation displayed on the second graphical user interface; and update, in real-time, the voice content animation rendered on the first graphical user interface and the visual representation on the second graphical user interface when the new content is characterized as the live conversation progresses.

2. The computer program product of claim 1, wherein the instructions, when executed by the at least one computing device, are further configured to:

receive the conversationally continuous voice input from the at least the first participant and the at least the second participant as part of at least one of a telephone call and a voice-over-IP (VOIP) computer network call.

3. The computer program product of claim 1, wherein the instructions, when executed by the at least one computing device, are further configured to:

convert the conversationally continuous voice input into text using a voice-to-text application program interface (API) implemented at a front end application server.

4. The computer program product of claim 1, wherein the instructions, when executed by the at least one computing device, are further configured to:

convert the conversationally continuous voice input into text at a front end application server;

provide the text to a back-end database system; and analyze the text to characterize content thereof at the back-end database system.

5. The computer program product of claim 4, wherein the instructions, when executed by the at least one computing device, are further configured to:

provide the characterized content to the front end application server; and render the voice content animation using the front end application server.

6. The computer program product of claim 4, wherein the instructions, when executed by the at least one computing device, are further configured to:

execute asynchronous calls at defined intervals to transmit the text from the frontend application server to the back-end database system.

7. The computer program product of claim 4, wherein the instructions, when executed by the at least one computing device, are further configured to:

provide a communications channel between the frontend application server and the back-end database system, over which the text is transmitted to the back-end database system and event-driven responses of characterized content are generated and sent to the front end application server.

8. The computer program product of claim 4, wherein the database system includes an in-memory database system.

9. The computer program product of claim 1, wherein the instructions, when executed by the at least one computing device, are further configured to:

analyze the text to characterize content thereof including defining a sentiment associated with the voice input of the at least one participant, based on individual words and/or phrases thereof, and characterizing an extent of the sentiment on a defined scale, wherein the sentiment and the extent are rendered as part of the voice content animation and repeatedly updated in conjunction therewith.

10. The computer program product of claim 1, wherein the instructions, when executed by the at least one computing device, are further configured to:

analyze the text to characterize content thereof including identifying a potentially-available database record;

executing a search for the potentially-available database record within a corresponding database to obtain search results; and rendering the search results as part of the voice content animation, including updating the search results and the voice content animation when a second potentially-available database record is identified and searched.

11. The computer program product of claim 1, wherein the instructions, when executed by the at least one computing device, are further configured to:

characterize the content of the text by characterizing current text converted from current voice input, together in aggregation with previously-characterized content obtained using voice input from earlier in the voice conversation, and/or from one or more preceding voice conversations.

12. A method of executing instructions stored on a non-transitory computer-readable storage medium using at least one processor, the method comprising:

receiving, during a live voice conversation, conversationally continuous voice input from at least a first participant of the voice conversation;

converting, during the live voice conversation, the conversationally continuous voice input into text in real time;

selecting at least a portion of the text;

triggering, based on the selected portion of the text, a real-time analysis of a sentiment of the first participant in the text;

analyzing, during the live voice conversation, the text using machine learning, to characterize content thereof, the characterization including a determination of whether a specific offer of a product or service is being discussed and a determination of a sentiment of the first participant during the live voice conversation;

determining, based on the sentiment of the first participant during the live voice conversation, a probability of the first participant accepting the specific offer of the product or service discussed;

rendering, using a first graphical user interface displayed to at least a second participant of the live voice conversation, a voice content animation that visually represents the characterized content, the visual representation of the characterized content including a representation of the sentiment of the first participant and a representation of the probability of the first participant accepting the specific offer of the product or service discussed during the live voice conversation;

transmitting data to the first participant for generating a visual representation of the specific offer of the product or service discussed during the live voice conversation on a second graphical user interface to be displayed on a computing device of the first participant, wherein the visual representation displayed on the first graphical user interface is synchronously displayed with the visual representation displayed on the second graphical user interface; and updating, in real-time, the voice content animation rendered on the first graphical user interface and the visual representation on the second graphical user interface when the new content is characterized as the live conversation progresses.

13. The method of claim 12, comprising:
converting the conversationally continuous voice input into text at a front end application server;
providing the text to a back-end database system;
analyzing the text to characterize content thereof at the back-end database system;
providing the characterized content to the front end application server; and
rendering the voice content animation using the front end application server.

14. The method of claim 12, comprising:
analyzing the text to characterize content thereof including defining a sentiment associated with the voice input of the at least one participant, based on individual words and/or phrases thereof;
characterizing an extent of the sentiment on a defined scale; and
rendering the sentiment and the extent as part of the voice content animation, including repeatedly updating the sentiment and the extent in conjunction with updating the voice content animation.

15. The method of claim 12, wherein the analyzing includes:
identifying a potentially-available database record;
executing a search for the potentially-available database record within a corresponding database to obtain search results; and
rendering the search results as part of the voice content animation, including updating the search results and the voice content animation when a second potentially-available database record is identified and searched.

16. A system comprising:
a front end application server configured to receive, during a live voice conversation, conversationally continuous voice input from at least a first participant of the voice conversation and convert the conversationally continuous voice input into text in real time, and further configured to provide the text to a back-end database system, wherein at least a portion of the text is selected and, based on the selected portion of the text, a real-time analysis of a sentiment of the first participant in the text is triggered;
a sentiment analyzer implemented at the back-end database system and configured to receive the text and characterize content thereof, the characterization including a determination of whether a specific offer of a product or service is being discussed and a determination of a sentiment of the first participant during the live voice conversation, based on individual words and/or phrases thereof; and
a probability calculator configured to determine, based on the sentiment of the first participant during the live voice conversation, a probability of the first participant accepting the specific offer of the product or service discussed; and
a rendering engine implemented at the front end application server and configured to
render, using a first graphical user interface displayed to at least a second participant of the live voice conversation, a voice content animation that visually represents the characterized content, the visual representation of the characterized content including a representation of the sentiment of the first participant and a representation of the probability of the first participant accepting the specific offer of the product or service discussed during the live voice conversation,
transmit data to the first participant for generating a visual representation of the specific offer of the product or service discussed during the live voice conversation on a second graphical user interface to be displayed on a computing device of the first participant, wherein the visual representation displayed on the first graphical user interface is synchronously displayed with the visual representation displayed on the second graphical user interface; and
update, in real-time, the voice content animation rendered on the first graphical user interface and transmit data to update the visual representation on the second graphical user interface when the new content is characterized as the live conversation progresses.

17. The system of claim 16, wherein the sentiment analyzer is further configured to cause the at least one processor to characterize an extent of the sentiment on a defined scale, and further wherein the sentiment and the extent are rendered as part of the voice content animation and repeatedly updated in conjunction therewith.

18. The system of claim 16, wherein the live voice conversation includes a customer service call between the at least the first participant including a customer and the at least the second participant including a customer service agent.

19. The system of claim 18, wherein the back end database system is further configured to:
identify a potentially-available database record for assisting the customer;
executing a search for the potentially-available database record within a database of the back end database system to obtain search results; and
rendering the search results as part of the voice content animation and in conjunction with the visual representation of the sentiment, including updating the search results and the voice content animation when a second potentially-available database record for assisting the customer is identified and searched.

20. The system of claim 19, wherein the rendering engine is configured to render the visual representation of the sentiment using a first graphical user interface of the customer service agent, and further configured to render the search results using both the first graphical user interface of the customer service agent, and a second graphical user interface of the customer.

* * * * *